United States Patent [19]

Himpsl

[11] Patent Number: 4,581,341

[45] Date of Patent: Apr. 8, 1986

[54] METHOD FOR PRODUCING CRACKING CATALYST

[75] Inventor: Francis L. Himpsl, Matawan, N.J.

[73] Assignee: Engelhard Corporation, Menlo Park, N.J.

[21] Appl. No.: 554,516

[22] Filed: Nov. 23, 1983

[51] Int. Cl.$^4$ ............................................. B01J 29/08
[52] U.S. Cl. ...................................... 502/68; 423/328
[58] Field of Search ............................ 502/64, 68, 72; 423/328

[56] References Cited

U.S. PATENT DOCUMENTS

| | | | |
|---|---|---|---|
| 3,647,718 | 3/1972 | Haden, Jr. et al. | 502/68 |
| 3,663,165 | 5/1972 | Haden, Jr. et al. | 423/328 X |
| 3,663,456 | 5/1972 | Upson et al. | 502/72 X |
| 3,752,772 | 8/1973 | Horzepa | 502/72 |

Primary Examiner—Carl F. Dees
Attorney, Agent, or Firm—Inez L. Moselle

[57] ABSTRACT

An improved process for preparing a fluid cracking catalyst is disclosed. A slurry of microspheres of kaolin clay calcined to undergo the characteristic exotherm, microspheres of kaolin clay calcined to metakaolin condition and sodium hydroxide solution is formed. The weight ratio of microspheres of kaolin calcined to undergo the exotherm to microspheres of kaolin calcined to metakaolin condition is in the range of about 9/1 to 4/1; the sodium hydroxide solution is of about 16% to 20% concentration and is present in amount such that the molar ratio of $Na_2O/Al_2O_3$ in said slurry is in the range of about 0.6 to 0.7. The slurry is aged and an additional quantity of microspheres of kaolin clay calcined to undergo the characteristic exotherm is added. The quantity of microspheres of clay calcined to undergo the exotherm added is such that the total weight ratio of such microspheres to microspheres of metakaolin is in excess of 9/1. Also added is an additional quantity of sodium hydroxide to produce a slurry having substantially the same sodium hydroxide concentration and substantially the same $Na_2O/Al_2O_3$ molar ratio as that of the original slurry. The reconstituted slurry is heated until crystals of zeolite of the faujasite type form in the microspheres in said slurry, and the crystallized microspheres are ion-exchanged to produce a fluid cracking catalyst.

11 Claims, No Drawings

METHOD FOR PRODUCING CRACKING CATALYST

BACKGROUND OF THE INVENTION

The invention relates to improvements in processes for converting mixtures of calcined clays into particles containing a crystalline zeolite molecular sieve component and a non-zeolitic component by reacting mixtures of calcined clays with sodium hydroxide solution. In particular, the invention relates to improvements in making zeolitic cracking catalysts useful in the fluidized catalytic cracking (FCC) of hydrocarbon feedstock from mixtures of calcined kaolin clays as described in U.S. Pat. Nos. 3,647,718 and 3,657,154.

Crystalline zeolitic molecular sieves are used in a wide variety of catalytic and adsorptive applications. Sieves of the faujasite type, especially ion-exchanged forms of zeolite Y, are well-known constituents of hydrocarbon conversion catalysts. In commercial practice, synthetic forms of zeolite Y are utilized as a component of such catalysts because naturally-occurring faujasite is highly limited in supply.

Synthetic zeolites of the Y-type are commerically available as finely divided high purity crystals. Present commercial use of such zeolites in the fluidized cracking of hydrocarbons requires that the zeolite crystals in the particles of catalyst be associated with a suitable matrix material such as a silica-alumina gel, clay or mixture thereof, to provide catalyst particles which operate at activity levels useful in present-day cracking units. The binder material also functions to impart attrition resistance to the catalyst particles. When preparing cracking catalysts from fine particle size crystals, the choice of a binder is limited by the fact that the binder must be thermally stable, provide access of gases or liquids to the zeolite crystals in the composite particles and result in particles of acceptable resistance to attrition.

The synthesis of a variety of zeolites from calcined clays, especially kaolin clay, is known. For example, metakaolin (kaolin clay calcined at a temperature of about 1200° to 1500° F.) will react with sodium hydroxide solution to produce sodium zeolite A. On the other hand, metakaolin can react with sodium silicate solutions under selected conditions to form synthetic zeolites of the faujasite type. When kaolin is calcined under more severe conditions, sufficient to undergo the characteristic exothermic reaction (for example calcination at about 1700° to 2000° F.), the calcined clay will react with sodium hydroxide solution under controlled conditions to synthesize faujasite-type zeolites.

The reaction between kaolin calcined to undergo the exotherm and sodium hydroxide in an aqueous reaction medium is quite sensitive to the history of the clay prior and during calcination. It is known that the addition of a minor amount of metakaolin relative to kaolin calcined to undergo the exotherm frequently assures that a desired amount of synthetic faujasite, especially zeolite Y having a desirably high $SiO_2/Al_2O_3$ ratio, will be crystallized under commercially viable production conditions.

Processes for producing zeolitic cracking catalysts useful in moving bed and fluidized (FCC) cracking units utilize the concept of employing calcined clay reactant(s) in substantially the same size and shape as the desired catalyst product. Because the bodies are zeolitized directly without a separate binding step to composite the zeolite and binder component, various embodiments of such processing have become known as "in situ" processes. Reference is made to the following commonly assigned patents of Haden et al: U.S. Pat. Nos. 3,391,994; 3,433,587; 3,503,900; 3,506,594; 3,647,718; 3,657,154; 3,663,165 and 3,932,268.

In producing FCC catalysts by the in situ process, preformed spray dried microspheres consisting of kaolin clay calcined to undergo the exotherm are mixed with particles of metakaolin and a solution of sodium hydroxide to form a slurry, which is then aged, typically for 4-8 hours at 100° F. and subsequently heated to crystallize a zeolite of the Y-type, typically by heating the aged slurry at about 180° F. for 20 to 25 hours. Preparation of an FCC cacalyst in this manner and using metakaolin in the form of a powder and kaolin calcined to undergo the exotherm in the form of microspheres is described in U.S. Pat. No. 3,657,154. Similar use of metakaolin in the form of microspheres and kaolin calcined to undergo the exotherm in microspheres separate from the microspheres composed of metakaolin is described in U.S. Pat. No. 3,647,718.

In practice of the procedure of U.S. Pat. No. 3,647,718, the microspheres composed of metakaolin and microspheres composed of kaolin calcined to undergo the exotherm are mixed before aging in a reactor vessel as a batch reaction. Subsequently the reactor charge is heated to effect the crystallization. The crystallization is also on a batch scale. All of the calcined clay reactants (e.g., microspheres of kaolin calcined to metakaolin condition and microspheres of kaolin calcined to undergo the exotherm) are mixed prior to aging. Crystallization time generally substantially exceeds aging time. Criteria for selecting ratios of microspheres of metakaolin to microspheres of clay calcined to undergo exotherm are set forth in U.S. Pat. No. 3,647,718 at col. 6, lines 3 to 18. Silica originally in the microspheres is leached or extracted during the reaction, producing a sodium silicate mother liquor which is removed in whole or in part from the crystallized microspheres. The microspheres, now containing a mixture of sodium zeolite Y and a silica-depleted (alumina enriched) residue of calcined clay, are subsequently subjected to ion-exchange treatment, typically with ammonium ions or ammonium and rare earth ions, to replace sodium ions with cations used in the exchange treatment(s).

SUMMARY OF THE INVENTION

The present invention relates to modifications of the "in-situ" zeolite synthesis process for producing a zeolitic cracking catalyst on a batch scale by reacting sodium hydroxide with a mixture of calcined kaolin clays, the minor proportion of which is clay calcined under metakaolin-forming conditions and the major proportion of which is clay calcined to undergo the exotherm. Practice of the process of the present invention involves a first modification of utilizing lower than normal weight ratios of kaolin clay calcined to undergo the exotherm to kaolin calcined to metakaolin condition in the aging step of the reaction. In other words, as compared to prior art practice, the process of the invention calls for the use of a greater amount of metakaolin relative to kaolin calcined to undergo the exotherm during the aging step of the process. The present invention involves the following further modifications, both carried out immediately following aging and prior to crystallization: (1) sufficient kaolin calcined to undergo the exotherm is added to the aged system to bring the weight ratio of kaolin calcined to undergo the exotherm to metakaolin up to a typical value, e.g. 95/5; (2) additional caustic solution is added such as to maintain a substantially constant molar ratio of solution $Na_2O$ (sodium oxide in the aqueous phase) to total calcined kaolin throughout aging and crystallization. Since all of the alumina in the system is supplied by the calcined clays, the molar ratio of $Na_2O$ to $Al_2O_3$ in the system is maintained constant, or substantially constant. The system is crystallized at elevated temperature following normal procedures. Subsequently, the crystallized material undergoes ion-exchange to reduce sodium content in a conventional manner, possibly on a continuous basis, by replacing sodium cations with one or more species of desirable cations, preferably ammonium and rare earth ions.

The invention in preferred form is practiced utilizing kaolin clay microspheres calcined to undergo the exotherm and a fluidizable catalyst suitable for use in FCC units is produced. Most preferably, the metakaolin is also utilized in the form of microspheres.

The potential advantage of this invention is in increased plant output, as the effective aging time required per batch of finished catalyst may be reduced by $\leq 50\%$. This advantage is achieved because only a fraction of the major source of silica and alumina used in the in-situ process (i.e. kaolin calcined to undergo the exotherm) is present during aging. For example, the invention provides a means to utilize a single large volume reactor which would be used exclusively for the aging process, feeding banks of smaller reactors devoted solely to crystallization. By staggering the crystallization schedule between different reactor banks, the aging reactor could be run filled to capacity at all times, and hence this would afford the desired reduction in net aging time per bank of crystallized product.

PREFERRED EMBODIMENTS

In preferred embodiments, the present invention involves improvements in the process for making fluidizable zeolitic cracking catalysts by the procedures described in U.S. Pat. Nos. 3,647,718 and 3,657,154, the entire disclosures of which are incorporated herein by cross-reference.

In accordance with the preferred embodiments of the invention a fluidizable zeolitic cracking catalyst is prepared by the steps of: (a) forming a slurry of microspheres of kaolin clay calcined to undergo the characteristic kaolin exotherm, metakaolin in the form of a powder or microspheres, preferably the latter, and sodium hydroxide solution; (b) aging the slurry from step (a); (c) incorporating an additional quantity of microspheres of kaolin clay calcined to undergo the characteristic kaolin exotherm and an additional quantity of sodium hydroxide to produce a slurry having substantially the same sodium hydroxide concentration and substantially the same $Na_2O/Al_2O_3$ molar ratio as that of the slurry in step (a); (d) heating the slurry from the step (c) until crystals of zeolite of the faujasite type form in the microspheres in said slurry, the faujasite preferably having a $SiO_2/Al_2O_3$ molar ratio (as determined by X-ray) of 4.5 or above, most preferably above 4.7; (e) recovering microspheres containing zeolite from step (d); and (f) ion-exchanging the recovered microspheres to replace sodium with one or more cations.

Preferably the weight ratio of microspheres of kaolin clay calcined to undergo the exotherm to metakaolin is in the range of 90/10 to 80/20 in step (a) and the quantity of microspheres of kaolin clay calcined to undergo the exotherm in step (c) is such that the total ratio of the amounts thereof added during steps (a) and (c) to metakaolin is in excess of 90/10, preferably about 95/5.

The sodium hydroxide concentration of the slurry at the beginning of steps (a) and (c) is preferably in the range of 16 to 20% and the molar ratio of $Na_2O/Al_2O_3$ is in the range of about 0.6 to 0.7; typically about 0.65 in steps (a) and (c). Most preferably concentration of the slurry at the beginning of steps (a) and (c) is about 19%.

EXAMPLES

In the examples, the term "Microspheres A" refers to microspheres obtained by spray drying high purity hydrated Georgia kaolin clay and calcining the microspheres in air under conditions sufficient to cause the clay to undergo the characteristic exotherm without forming mullite. The term "Microspheres B" refers to microspheres obtained by spray drying similar hydrated Georgia kaolin clay of high purity and calcining the resulting microspheres in air under conditions of time and temperature to convert the clay into metakaolin.

In a typical synthesis of the prior art, Microspheres A and B would be mixed in a 95/5 weight ratio, slurried with NaOH solution of about 19% weight concentration and in amount to provide 0.65 moles $Na_2O$ per mole $Al_2O_3$ in the mixture of Microspheres A and B. The slurry would be aged in a batch reactor at about 100° F. for 6–8 hours and heated, also on a batch scale, to about 180° F. for sufficient time to crystallize a zeolite having the X-ray pattern of sodium zeolite Y characterized by molar a $SiO_2/Al_2O_3$ ratio above 4.5 and a zeolite content, also estimated from the X-ray pattern of the sodium form zeolite, of about 20–25%.

The examples which follow demonstrate the advantage of utilizing only a fraction of the major source of silica and alumina (i.e., Microspheres A) when forming the initial slurry that is aged and deferring addition of the balance of Microspheres A until the crystallization step, while simultaneously controlling sodium hydroxide concentration and the molar ratio of $Na_2O/Al_2O_3$ in the system.

In all of the examples, the sodium hydroxide concentration was determined by titration and the reported molar ratios $Na_2O/Al_2O_3$ in the reaction mixture represent actual moles $Na_2O$ (i.e. corrected to account for impurities in the NaOH solution used as the source of the $Na_2O$).

EXAMPLE 1

A reactant slurry was prepared consisting of 300 g Microspheres A, 33.3 g Microspheres B, 313.7 g NaOH solution (24.88%) and 97.05 g $H_2O$. The slurry was then aged for six hours at 100° F. The composition of the aged slurry was as follows:

Moles $Na_2O$/Moles $Al_2O_3 = 0.65$
Wt. Microspheres A/Wt. Microspheres B = 90/10 = 9
% NaOH solution concentration = 19% (weight percent)

After aging, 333.3 g additional Microspheres A, 313.7 g NaOH solution (24.88%), and 95.05 g $H_2O$ were added to the system, and the temperature was raised to 180° F. to effect crystallization. At this point the weight ratio of Microspheres A/Microspheres B has been effectively increased to 95/5 = 19, while the molar $Na_2O$-

/Al$_2$O$_3$ ratio has been maintained at 0.65, and NaOH concentration was unchanged.

EXAMPLE 2

A similar slurry was aged, consisting of 300 g Microspheres A, 52.9 g Microspheres B, 332.1 g NaOH solution (24.88%), and 102.8 g H$_2$O. (This system incorporates an initial Microspheres A/Microspheres B weight ratio of 85/15=5.67). Following aging, 705.9 g additional Microspheres A, 664.2 g NaOH solution (24.88%), and 205.5 g H$_2$O were added to the system, which was then crystallized as in the first example. Note that the final weight ratio of Microspheres A/Microspheres B was effectively increased to 95/5 prior to crystallization, while Na$_2$O/Al$_2$O$_3$ and caustic concentration were unchanged.

EXAMPLE 3

A similar slurry was aged, consisting of 300 g Microspheres A, 75.0 g Microspheres B, 352.9 g NaOH solution (24.88%), and 109.2 g H$_2$O. The initial Microspheres A/Microspheres B weight ratio in this system is 80/20=4. Following aging, 1125 g additional Microspheres A, 1059g NaOH solution (24.88%), and 327.7 g H$_2$O were added to the system, bringing the final Microspheres A/Microspheres B weight ratio up to 95/5, while maintaining constant Na$_2$O/Al$_2$O$_3$ and NaOH concentration values of 0.65 and 19%, respectively. This system was also crystallized as in the preceding examples.

Each crystallization reaction for Examples 1 to 3 was analyzed for zeolite content at three intervals, summarized below.

Crystallization results for Examples 1 to 3 are summarized below in table form.

TABLE
Crystallization Data

| Aging System | Crystallization A/B* | hrs | % Y | hrs | % Y | hrs | % Y | (Final) SiO$_2$/Al$_2$O$_3$ In Zeolite |
|---|---|---|---|---|---|---|---|---|
| Ex. 1  90/10 | 95/5 | 19 | 19 | 21 | 19 | 24 | 21 | 4.42 |
| Ex. 2  85/15 | 95/5 | 19 | 0 | 21 | 9 | 24 | 13 | — |
| Ex. 3  80/20 | 95/5 | 19 | 0 | 21 | 0 | 24 | 8 | — |

*Weight ratio Microspheres A/Microspheres B

Data in the table show that after 20–24 hours crystallization, the system of Example 1 produced a zeolite yield and SiO$_2$/Al$_2$O$_3$ ratio comparable to that of a typical "in-situ" crystallization reaction product, even though only half the material crystallized had been subjected to the conventional aging procedure. The data suggest that crystallization periods greater than 24 hours would probably be required to produce ca. 20% zeolite under the conditions used in Examples 2 and 3. However, these systems represent the crystallization of three and four times, respectively, the amount of catalyst per a single aging step, and this increase in yield could hence compensate for additional required crystallization time.

The following examples further illustrate the potential yield advantages afforded by the present invention. In essence, Examples 4 and 5 show that a single batch of microspheres of calcined kaolin clay aged under appropriate conditions can support the crystallization of two and three times, respectively, its weight of finished catalyst. The processing scheme envisioned in Examples 4 and 5 entails the usage of one or more reactor vessels exclusively for aging, each of which is ultimately drained into twice (Example 4) or three times (Example 5) the number of crystallization tanks of equal volume (filling each to half capacity), the balance being made up by the addition of fresh Microspheres A and caustic solution. The crystallization schedule is staggered so that the aging reactor is always run at full capacity.

EXAMPLE 4

$$\frac{\text{Crystallization Volume} = 2 \times \text{Aging Volume}}{\text{wt. ratio of Microspheres } A/\text{Microspheres } B} =$$

90/10 in aging; 95/5 in crystallization

The system comprises one aging reactor of volume=V feeding four banks of crystallization reactors (each of the same volume=V), with two reactors per bank, (9 vessels total). Residence times within the aging and crystallization reactors will be assumed to be 6 hours and 24 hours respectively, and time required for draining tanks and re-filling is considered to fall within these intervals. At time t=to, consider the process to be underway with all crystallization reactors full and staggered in schedule such that the four banks are respectively 0 hrs., 6 hrs., 12 hrs., and 18 hrs. into the 24 hr. crystallization cycle. The aging reactor is charged at this point. After 6 hrs., the contents of one crystallization reactor bank (2 V) have crystallized to completion, and are drained off as finished product slurry. This bank is then re-charged and is in place for another 6 hr. cycle, after which the process is repeated to yield another 2 V of finished product slurry from the second reactor bank to mature. After 24 hrs. of operation, the total volume of slurry processed is 8 V, giving a rate of 8 V/24 hrs.=0.33 V/hr.

Note that if these same 9 reactors were used for aging and crystallization as per the normal in-situ process over a 30 hr. reaction period (6 hrs. aging plus 24 hrs. crystallization), the yield produced would be 9 V/30 hrs., or 0.30 V/hr. Hence, an 11% increase in production rate is obtained with the former process having a staggered crystallization schedule.

EXAMPLE 5

$$\frac{\text{Crystallization Volume} = 3 \times \text{Aging Volume}}{\text{wt. ratio of Microspheres } A/\text{Microspheres } B} =$$

85/15 in aging; 95/5 in crystallization

This system also contemplates the use of one aging reactor of volume V feeding four banks of crystallization reactors, but with three reactors per bank, (a total of 13 vessels). The crystallization schedules of the reactor banks are staggered as in Example 4. In this case, a finished product slurry volume of 3 V is produced every 6 hrs., or 12 V/24 hrs., giving a rate of 0.5 V/hr. A similar system of 13 reactors operated by the current in-situ method would yield 13 V/30 hrs., or 0.43 V/hr., demonstrating a 16% increase for the staggered crystallization schedule process in this case.

Another potential advantage to the process modifications of the present invention is in energy savings. Since only one-half to one-third of the ultimate plant output need undergo the aging process, the amount of heat required to maintain a greater volume of slurry at 100° F. is saved.

I claim:

1. A process for the production of a zeolitic material which comprises the steps of:
    (a) forming a mixture of kaolin clay calcined to undergo the characteristic kaolin exotherm, metakaolin and sodium hydroxide solution,
    (b) aging the mixture from step (a),
    (c) incorporating an additional quantity of kaolin clay calcined to undergo the characteristic kaolin exotherm and an additional quantity of sodium hydroxide to produce a second mixture having substantially the same sodium hydroxide concentration and substantially the same $Na_2O/Al_2O_3$ molar ratio as that of the mixture in step (a),
    (d) heating the slurry from the step (c) until crystals of zeolite of the faujasite type form, and
    (e) recovering zeolite-containing particles from step (d).

2. A process for the production of a zeolitic cracking catalyst which comprises the steps of:
    (a) forming a slurry of microspheres of kaolin clay calcined to undergo the characteristic kaolin exotherm, metakaolin in the form of a powder or microspheres and sodium hydroxide solution,
    (b) aging the slurry from step (a),
    (c) incorporating an additional quantity of microspheres of kaolin clay calcined to undergo the characteristic kaolin exotherm and an additional quantity of sodium hydroxide to produce a slurry having substantially the same sodium hydroxide concentration and substantially the same $Na_2O/Al_2O_3$ molar ratio as that of the slurry in step (a),
    (d) heating the slurry from the step (c) until crystals of zeolite of the faujasite type form in the microspheres in said slurry,
    (e) recovering microspheres containing zeolite from step (d), and
    (f) ion-exchanging the recovered microspheres to replace sodium with one or more cations.

3. The process of claim 2 wherein said metakaolin is in the form of microspheres.

4. The process of claim 2 wherein the weight ratio of microspheres of kaolin clay calcined to undergo the exotherm to metakaolin is in the range of 90/10 to 80/20 in step (a).

5. The process of claim 2 wherein the microspheres of kaolin clay calcined to undergo the exotherm in step (c) is such that the total ratio of the amounts thereof added to steps (a) and (c) to metakaolin is about 95/5.

6. The process of claim 2 wherein the sodium hydroxide concentration of the slurry at the beginning of steps (a) and (c) is in the range of 16 to 20%.

7. The process of claim 2 wherein the sodium hydroxide concentration of the slurry at the beginning of steps (a) and (c) is about 19%.

8. The process of claim 2 wherein the molar ratio of $Na_2O/Al_2O_3$ is about 0.65 in steps (a) and (c).

9. A process for the production of a fluidizable zeolitic cracking catalyst which comprises the steps of:
    (a) forming a slurry of microspheres of kaolin clay calcined to undergo the characteristic exotherm, microspheres of kaolin clay calcined to metakaolin condition and sodium hydroxide solution, the weight ratio of microspheres of kaolin clay calcined to undergo the exotherm to microspheres of kaolin clay calcined to metakaolin condition being in the range of about 9/1 to 4/1, the sodium hydroxide solution being of about 16% to 20% concentration and being present in amount such that the molar ratio of $Na_2O/Al_2O_3$ in said slurry is in the range of about 0.6 to 0.7,
    (b) aging the slurry from step (a),
    (c) incorporating into said aged slurry an additional quantity of microspheres of kaolin clay calcined to undergo the characteristic exotherm such that the total weight ratio of such microspheres to microspheres of metakaolin is in excess of 9/1 and also adding an additional quantity of sodium hydroxide to produce a slurry having substantially the same sodium hydroxide concentration and substantially the same $Na_2O/Al_2O_3$ molar ratio as that of the slurry in step (a),
    (d) heating the slurry from the step (c) until crystals of zeolite of the faujasite type form in the microspheres in said slurry,
    (e) recovering microspheres containing zeolite from step (d) and
    (f) ion-exchanging the recovered microspheres to replace sodium with one or more cations.

10. The process of claim 9 wherein the ratio of the microspheres is about 8/1 and the $Na_2O/Al_2O_3$ in the slurries of the outset of steps (a) and (c) is 0.65±0.01.

11. The process of claims 2 or 9 wherein a batch of aged slurry from step (b) is subdivided into at least two batches, each of which is introduced into a separate crystallization reactor after step (b) and before step (c), whereby a single batch of aged slurry is used as charge for at least two reactors in which crystallization takes place.

* * * * *

UNITED STATES PATENT AND TRADEMARK OFFICE
CERTIFICATE OF CORRECTION

PATENT NO. : 4,581,341
DATED : April 8, 1986
INVENTOR(S) : F. L. Himpsl

It is certified that error appears in the above-identified patent and that said Letters Patent are hereby corrected as shown below:

Column 6, lines 10 to 16, correct the example by deleting
   the letter [B] before the "=",
   and inserting the letter --B-- immediately
   following "Microspheres A/Microspheres ".

Column 6, lines 46 to 53, correct the example by deleting
   the letter [B] before the "=",
   and inserting the letter --B-- immediately
   following "Microspheres A/Microspheres ".

Signed and Sealed this

Twenty-fifth Day of November, 1986

*Attest:*

DONALD J. QUIGG

*Attesting Officer*  *Commissioner of Patents and Trademarks*